United States Patent [19]

Kadowaki

[11] 4,272,809
[45] Jun. 9, 1981

[54] CHANNEL DEVICE

[75] Inventor: Yoshihiko Kadowaki, Hadano, Japan

[73] Assignee: Hitachi, Ltd., Tokyo, Japan

[21] Appl. No.: 961,245

[22] Filed: Nov. 16, 1978

[30] Foreign Application Priority Data

Nov. 16, 1977 [JP] Japan .................................. 52-136677
Feb. 1, 1978 [JP] Japan ..................................... 53-9268

[51] Int. Cl.³ .............................................. G06F 3/00
[52] U.S. Cl. ................................................... 364/900
[58] Field of Search ... 364/200 MS File, 900 MS File

[56] References Cited

U.S. PATENT DOCUMENTS 3,344,406   9/1967   Vinal .................................... 364/900
3,439,342   4/1969   Barton ................................. 364/900

Primary Examiner—Raulfe B. Zache
Attorney, Agent, or Firm—Craig & Antonelli

[57] ABSTRACT

The channel device uses a first and a second data buffer therefore with first data buffer being used for data transfer to or from a main storage which has a data storage position determined by a data address indicating the data storage position in the main storage. The second data buffer used for data transfer to or from an I/O has a data storage position unrelated to the data address.

7 Claims, 4 Drawing Figures

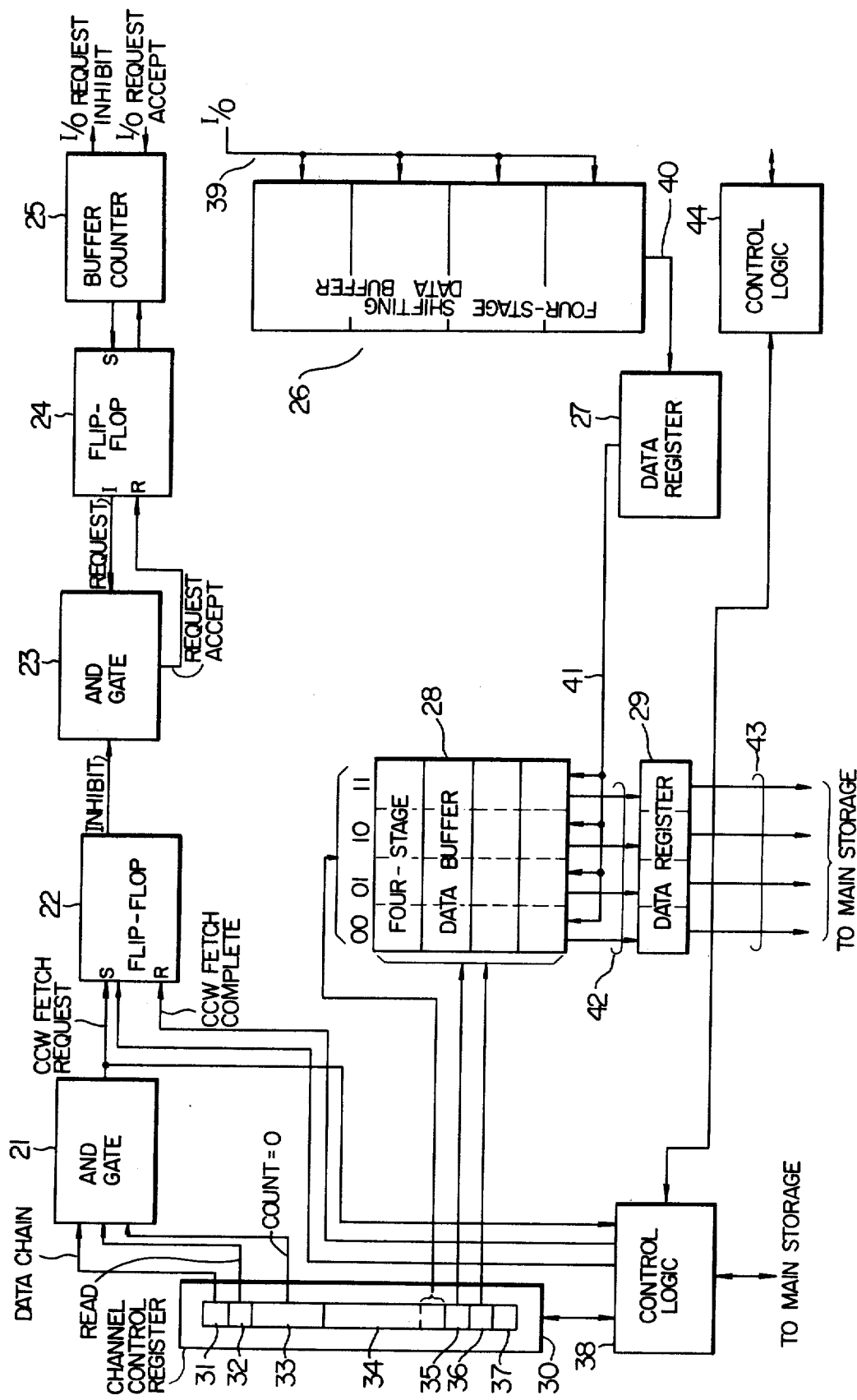

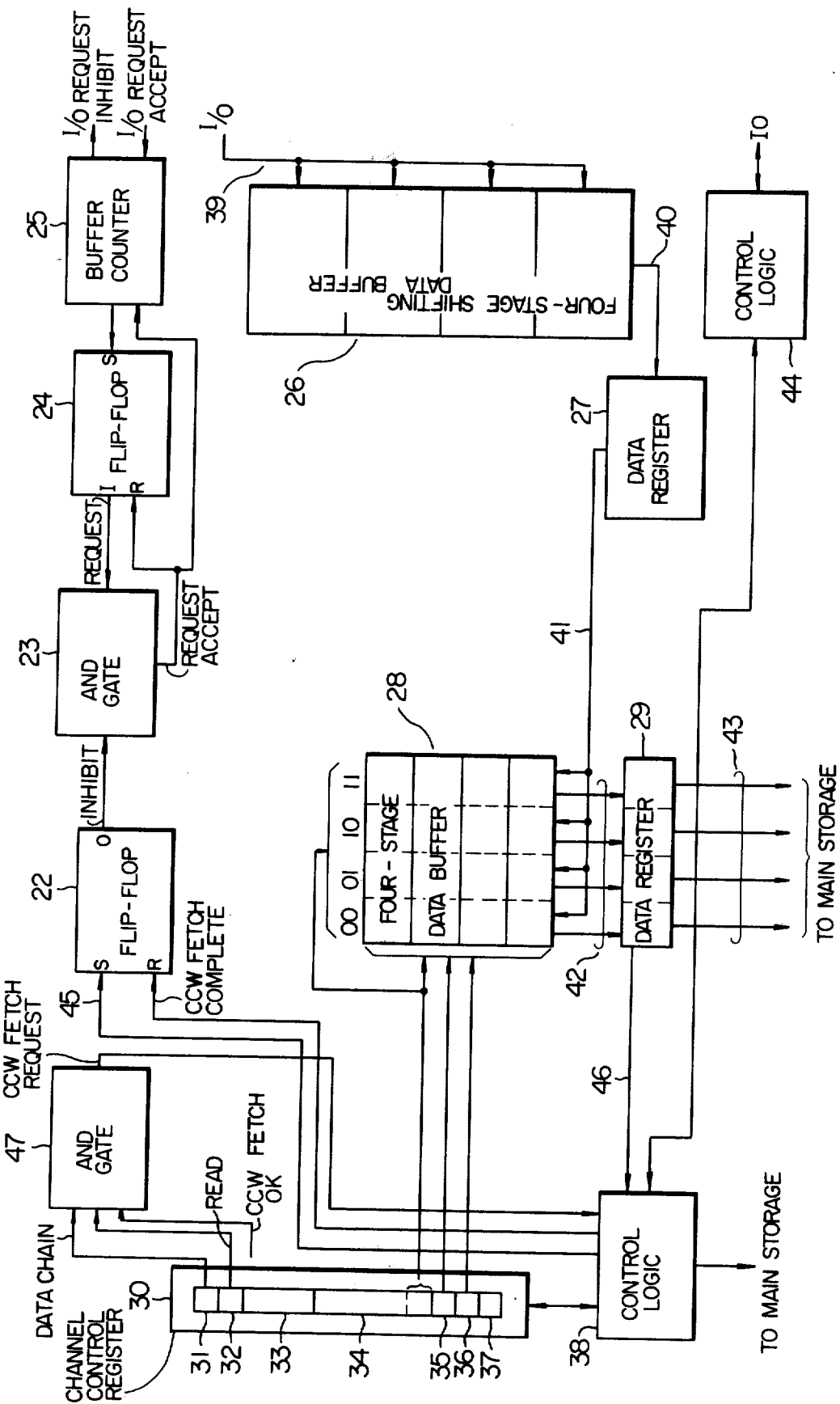

CHANNEL DEVICE

FIELD OF THE INVENTION

This invention relates to a channel device, or more in particular to an improvement in data chaining operation for execution of, for instance, a read command.

DESCRIPTION OF THE PRIOR ART

The data chaining is a function in which without interrupting the data transfer to or from an input/output (I/O) device, a data address is updated by updating a channel command word (CCW), thus carrying out continuous data transfer to or from the jumped region of a main storage (MS). In order to carry out the data chaining operation without overrun of data transfer, therefore, the channel device is required to update the channel command word at high speed. Generally, in the data chaining operation for execution of a write command, the next CCW is fetched in advance while a current CCW is being executed, so that data transfer in response to the next CCW may be started without interruption upon completion of the data transfer of the current CCW. In executing a read command, however, the next CCW may be rewritten by the data read in response to the current CCW, and therefore the next CCW is required to be fetched after completion of data transfer for the current CCW. Thus it is very difficult for the channel device to carry out the data chaining operation without any data overrun at the high-speed input/output unit in execution of a read command. One of the conventional methods of overcoming this difficulty will be briefly explained below.

The diagram of FIG. 1 shows an example of a configuration of a data buffer of a conventional channel device and component elements built around it. In FIG. 1, reference numeral 1 designates a four-stage buffer with data width of 4 bytes, numeral 2 a data register with data width of 4 bytes for data transfer between channels and MS, numeral 3 a data register for temporarily holding a read data from I/O with 1-byte width, numeral 4 a data bus from I/O with 1-byte width, numeral 5 a data bus for writing the content of the data register 3 with 1-byte data width into the data buffer 1, numeral 6 data buses for reading the data in the data buffer 1 with 4-byte width out onto the data register 2, and numeral 7 data buses for transferring the data in the data register 2 with 4-byte width to MS.

In ordinary execution of a read command, the data transferred from I/O is first temporarily stored in data register 3 and then transferred to a predetermined position in the data buffer 1 by control of a data address based on CCW. The byte position of the data buffer 1 to which the data is transferred is controlled by the lower two bits of the data address. In order to facilitate transfer of data to MS, the data width of data buffer 1 is designed to match the data width of the data buses 7 connected with MS.

Next, one of the conventional operations for data chaining in response to a read command will be explained with reference to FIG. 1. The channel device first executes a read command in the first CCW with chain data indication. Upon completion of data transfer of the count designated by the particular CCW, all the data remaining in the data buffer 1 are stored in MS, and the CCW next to be executed is fetched from MS. Thus the data address is established for continuation of data transfer. On the other hand, I/O continues the data transfer operation before establishment of the data address for the next CCW even after the channel device has completed execution of the first CCW. In view of the fact that the data address is not yet established and therefore the lower two bits of the address are not determined in spite of room being available in the data buffer 1, however, the channel device cannot determine the byte position of the data buffer 1 and therefore cannot receive the data from I/O. On the assumption that the data address not yet established begins from the 4-byte boundary (the lower two bits 00 of the data address), the data from I/O is received and stored in data buffer 1.

This method mentioned above is based on the assumption that the data chaining starts from the 4-byte boundary. In the absence of an actually-established data address in the 4-byte boundary, therefore, subsequent data transfer is impossible to execute. In that case, a check bit called a chaining check is set at a channel status word (CSW), ending in an abnormality. This means that the software cannot use the data chaining in other than the 4-byte boundary, thus imposing a great burden on the software.

SUMMARY OF THE INVENTION

Accordingly, it is an object of the present invention to provide a data chaining function in which the limitation on the data address of software in the conventional method is eliminated.

It is another object of the present invention to provide a channel device of which the throughput time is short in data transfer from I/O devices to a main storage.

According to the present invention, there is provided a channel device comprising first and second data buffers. The first data buffer is for data transfer to or from MS and has a data storage position determined by a data address indicating the storage position in MS. The second data buffer is for data transfer to or from I/O and has a data storage position unrelated to the data address. Data from I/O is transferred to the second data buffer regardless of whether or not the data address is established. Data from the second data buffer, however, is transferred to the first data buffer only when the data address is established.

According to the channel device of the present invention, a read command associated with a chain data indication is so executed that the next CCW may be fetched and processed either at the time of detection that the remaining data count is zero, or before the remaining data count is reduced to zero if the remaining data clearly indicates that the next CCW is not rewritten by the execution of the current CCW.

In the latter case, data address indicated by the next CCW is established earlier so that data transferred after data transfer of the current CCW is able to be placed in the predetermined byte position of the data buffer. In the actual computer system, the CCW to be executed next is rarely rewritten by the execution of the current CCW. In substantially every case of data chaining of a read command, therefore, the advanced processing of the next CCW is possible.

According to the present invention, dual data buffer functions are employed when the data address is not established, and therefore CCW is positively updated without interrupting data transfer to or from I/O. Thus, high-performance in the process of data chaining is attained without any operating limitation of software.

BRIEF DESCRIPTION OF THE DRAWINGS

FIGS. 2 and 3 are diagrams showing examples of configuration of the data buffer and components built therearound in an embodiment of a channel device according to the present invention.

DESCRIPTION OF THE PREFERRED EMBODIMENTS

Figure 1:
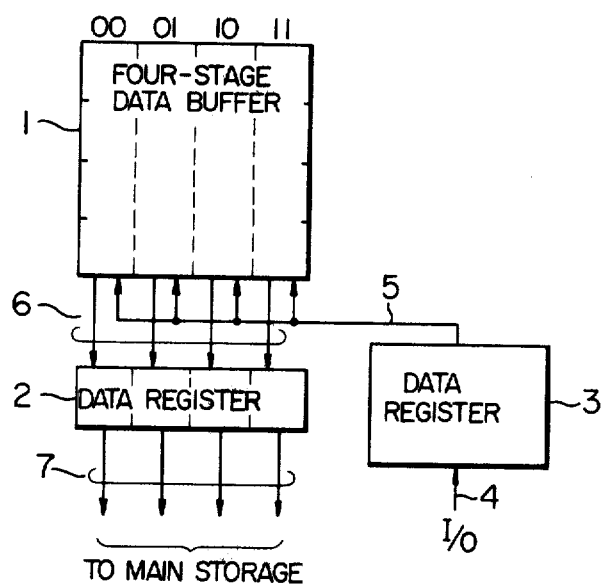
FIG. 1 is a diagram showing an example of configuration of the data buffer and components built therearound in a conventional channel device.

An embodiment of the present invention is shown in FIG. 2. This is an embodiment in which the next CCW is fetched from the MS at the time of detection that the remaining count is zero during, execution of a read command associated with a chain data indication. The configuration of FIG. 2 will be briefly explained. Numeral 21 designates an AND gate, numeral 22 a flip-flop, numeral 23 an AND gate, numeral 24 a flip-flop, and 26 a four-stage shifting data buffer with 1-byte width for temporarily storing the data transferred from I/O. Numeral 25 designates a buffer counter indicating the number and write position of the data stored in the data buffer 26, numeral 27 a data register with data width of 1 byte, numeral 28 a four-stage data buffer with data width of 4 bytes, numeral 29 a data register of 4-byte width for data transfer from channel to MS, and numeral 30 a channel control register (hereinafter referred to as CCR) for storing data required for data transfer by the channel device. Numerals 31 to 37 designate those data stored in CCR 30 which are related to the present invention, of which numeral 31 designates an instruction bit for chain data, numeral 32 a bit showing whether a command in execution is a read or write one, numeral 33 the remaining data count of the command in execution, numeral 34 a data address, and numeral 35 a pointer (hereinafter referred to as CP) for indicating the stage position of the data buffer 28 where data transferred from the data buffer 26 is to be stored. Numeral 36 a pointer (hereinafter referred to as SP) for indicating the stage position of the data buffer 28 from which data is to be transferred to MS. Numeral 37 designates a pointer (hereinafter referred to as LP) for indicating up to which stage of the data buffer 28 data transfer to MS is required. Numeral 38 shows a logic unit (hereinafter referred to as a control logic) for controlling the data buffer 28, CCR 30 and the channel-MS interface. Numeral 39 designates a data bus of 1-byte data width leading from the I/O interface to the data buffer 26, numeral 40 a data bus of 1-byte data width leading from the data buffer 26 to data register 27, numeral 41 a data bus of 1-byte data width leading from the data register 27 to the data buffer 28, numeral 42 data buses of 4-byte data width leading from the data buffer 28 to the data register 29, numeral 43 data buses of 4-byte data width leading from the data register 29 to MS, and numeral 44 a logic unit (hereinafter referred to as the control logic for controlling the data buffer 26 and the I/O interface.

First, explanation will be made of the data transfer operation in execution of an ordinary read command, with reference to FIG. 2. Upon the request from I/O for data transfer, the control logic 44 confirms that no I/O request-inhibit signal is generated from the buffer counter 25. From the data bus of the I/O interface through the data bus 39 connected therewith, the data is stored in the storage position of the data buffer 26 indicated by the buffer counter 25, so that I/O request-accept signal is turned on and the buffer counter 25 is counted by one. When the third stage ($2^2$) of the buffer counter 25 counts one, $2^2=1$, i.e., when the data buffer 26 is filled up, the I/O request-inhibit signal is turned on, thereby prohibiting receipt of a data transfer request from I/O until the data buffer 26 comes to have room to accept. When the buffer counter 25 indicates a positive value, i.e., when a data is stored in the data buffer 26, the flip-flop 24 is set and the request signal is turned on. This request signal takes the form of a signal requesting data transfer from data buffer 26 to data buffer 28. Unless an inhibit signal is applied to the AND gate 23, the data transfer request is accepted and a request-accept signal is returned so that the data stored in the data buffer 26 is transferred to the data register 27 via the data bus 40. Also, upon the returning of the request-accept signal, the buffer counter 25 is counted down by one on the one hand and the flip-flop 24 is reset so that the whole data stored in the data buffer 26 is shifted by one byte. By shifting the data by one byte, the data to be transferred next to the data buffer 28 from the data buffer 26 is set in the data bus 40. If the result of counting down the buffer counter 25 is a positive value, the flip-flop 24 is set again; while if it is zero, the flip-flop 24 is not set. The data transferred to the data register 27 is stored by control of the control logic 38 at the buffer position indicated by CP35 of data buffer 28 at the byte position indicated by the lower two bits of data address. In this way, the data which is the result of editing the byte position in the form of data transfer to MS is stored in the data buffer 28. The control logic 38, after storing the data in the data buffer 28, counts up the data address by one and counts down the data count by one. And when the updated data address has the 4-byte address, i.e., the lower two bits of 00, it means that data of 4-byte width transferrable is formed, so that a data transfer request is issued to MS. In the absence of a previous data transfer request to be processed, the data address transferred to MS takes the form of an address with the lower two bits of 00 of the data address before being updated. Further, after the value of CP35 is tranferred to SP36 and LP37, the value of CP35 is increased by one. In the presence of an unprocessed previous data transfer request at the time of data transfer request to MS, on the other hand, the values of CP35 and LP37 are increased by one, thereby ending the process. When the values of CP35 and SP36 are identical to each other, it indicates that the data transfer request to MS is unacceptable since data remains unprocessed and the data buffer 28 is filled to capacity. In that case, the control logic 38 sets the flip-flop 22 and prohibits the acceptance of the request signal until room is available in the data buffer 28. When the data transfer request to MS is accepted, the control logic 38 adds plus 1 to SP36, and continues to request data transfer to MS until the data transfer request for the value of P36 equal to LP37 is accepted.

Next, explanation will be made of the data chain operation in the presence of a data chain instruction. When the subtraction of data count at the time of data transfer with a chain data indication results in zero, the AND gate 21 is opened, and thus the flip-flop 22 is set. As a result, an inhibit signal is applied to the AND gate 23, so that the receipt of the request signal is restricted. On the data buffer 26 side, even after restriction of receipt of the request signal, the receipt of I/O request is not restricted but the transfer may be continued independently of the operation of data buffer 28 until the data buffer 26 is filled to capacity. On the data buffer 28 side, simultaneously with the turning on of the inhibit signal, the next request for reading CCW is turned on. After the control logic 38 has processed all the data transfer requests to MS unprocessed at that time, the chained CCW is read out of MS. After the next data address is established, the flip-flop 22 is reset and begins to accept the request signal from the data buffer 26. Thus in compliance with the newly established data address instruction, the data stored in the data buffer 26 during the read processing of CCW are sequentially transferred to the data buffer 28.

In the embodiment shown in FIG. 2, buffer counter 25 has a function to indicate a write position of data buffer 27, but means for indicating the write position of data buffer 27 is not limited to such a counter. For example, a register such as a flip-flop or the like may be used to store the write position. In addition, it is possible to indicate the unwritten position of the data buffer instead of indicating the write position. In short, the function to indicate the write position is not so important in the embodiment but the function to indicate a state of whether or not a data is stored in the data buffer area. The four stages of shift registers are used as second data buffer 26, and however the second data buffer 26 is not necessarily required to be a shift register but may be a mere buffer having a plurality of storage areas. The second data buffer 26 is sufficient to function as a data buffer for the first data buffer 28, and accordingly is not limited to the present embodiment. The steps of data write-in from I/O device and data transfer to the first data buffer 28 can be freely selected in accordance with arrangement of the data buffer.

Another embodiment of the present invention is shown in FIG. 3. In this embodiment, the reading of the next CCW is performed before the remaining data count is reduced to zero in the execution of a read command with a data chain instruction.

In FIG. 3, like reference numerals as in FIG. 2 denote like component elements. Numeral 47 designates an AND gate similar to the AND gate 21 in FIG. 2. A circuit for generating a CCW fetch OK signal which is applied to the AND gate 47 is shown in FIG. 4.

The CCW for the channel device explained herein is comprised of 8 bytes and the address thereof on MS represents the 8-byte boundary. This type of channel device is widely known.

Figure 4:
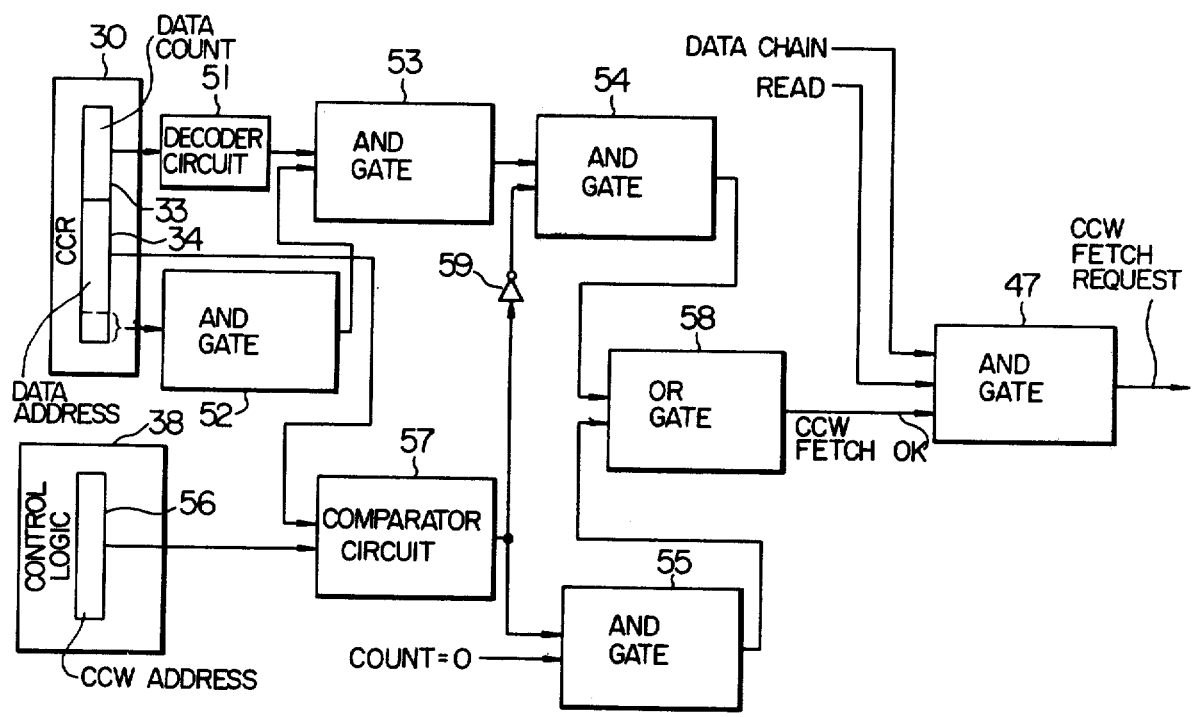
FIG. 4 is a diagram showing a circuit for generating a CCW fetch OK signal in FIG. 3.

In FIG. 4, numeral 51 designates a decoder circuit for detecting whether or not the remaining data count 33 is 8 or less. Numeral 52 designates an AND gate for determining whether or not all the three lower bits of the data address 34 are zero, numeral 56 the next CCW address set in the control logic 38, and numeral 57 a comparator circuit for determining whether or not the data address 34 is identical to the CCW address 56. When the outputs of the decoder 51 and the AND gate 52 are applied to the AND gate 53, it indicates that the remaining data is not more than eight bytes and that the data next to be stored represents the 8-byte boundary. When the output of AND gate 53 and the output of comparator circuit 57 the polarity of which is reversed by the inverter 59 are applied to the AND gate 54, on the other hand, it is detected that it is impossible to rewrite the next CCW by the remaining data. In the case where the comparator circuit 57 detects that the data address 34 and the CCW address 56 are identical to each other, i.e., that it is possible to rewrite the next CCW by the remaining data, the AND gate 55 holds the reading of the next CCW until the remaining data count is zero. The outputs of AND gates 54 and 55 are applied to the OR gate 58, thus generating a CCW fetch OK signal which constitutes the condition for reading CCW in the execution of data chain of read command.

The data transfer operation for execution of an ordinary read command of the channel device is similar to that of FIG. 2. Next, explanation will be made of the data chain operation in the presence of a data chain instruction.

When all the lower three bits of data address 34 are zero or the 8-byte boundary is indicated at the time of a data transfer request to MS during data transfer with a data chain instruction, the AND gate 52 is turned on. If the value of the data count 33 is not more than eight at this time, the output is produced from the decoder 51 so that the AND gate 53 is opened. On the other hand, the data address 34 is compared with the CCW address 56 in the comparator circuit 57, and if they fail to coincide with each other, the output is produced from the inverter 59. Thus the AND gate 54 is opened, and the OR gate 58 produces a CCW fetch OK signal indicating that the reading of CCW is possible. At the same time, on the condition that a read command signal with a data chain instruction is to be executed, the AND gate 47 is opened, thus producing a signal CCW fetch request signal requesting the control logic 38 to read CCW. The control logic 38 processes all the data transfer requests to MS which are still unprocessed at that time, and reads out a new CCW by use of CCW address 56. The new CCW thus obtained is stored within the control logic 38. In the meantime, transfer is made between I/O and the data buffer 26 and between data buffer 26 and data buffer 28. If the advanced processing of a new CCW is completed before the value of data count 33 is reduced to zero, it is possible that the CCW data transfer in execution is followed by the data transfer of the next new CCW. In other words, when the current data count 33 for the current CCW is reduced to zero with the new CCW processed in advance, the command designation bits 31 to 37 except 32 in the CCR 30 are updated on the basis of the next CCW stored in the control logic 38, with the result that the data from the data buffer 26 is stored in a predetermined position of data buffer 28 based on the new data address 34. After that, the processing is completely the same as that for execution of the ordinary read command as mentioned above.

In the case where the value of the data count 33 is reduced to zero before the advanced processing of new CCW is completed, on the other hand, the subsequent storage position of data buffer 28 is not clear. Therefore, the flip-flop 22 is set from the control logic 38 via the signal line 45, and the AND gate 23 is caused to generate an inhibit signal, thus prohibiting the receipt of a request signal. In this way, data transfer from data buffer 26 to data buffer 28 is prohibited. Since the receipt of the I/O request signal is not prohibited, however, data from I/O is transferred to data buffer 26 until it is filled to capacity, thus continuing the data transfer with I/O. Upon completion of the reading of a new CCW, the next data address 34 is established and then the flip-flop 22 is reset. The request signal from the data buffer 26 begins to be accepted, and the data stored in the data buffer 26 are transferred in sequence to the data buffer 28 in accordance with the new data address instruction. Subsequent processing is quite the same as that for execution of an ordinary read command.

When the data address 34 is identical to CCW address 56, the comparator circuit 57 produces an output. In this case, the advanced processing of CCW is impossible before the value of the data count 33 is reduced to zero. By the signal count zero produced when the data count 33 is reduced to zero, the AND gate 55 is opened, and the CCW fetch OK signal is produced from the OR gate 58. Thus on the condition that the read command with a data chain instruction is to be executed, the AND gate 47 is opened, so that the CCW fetch request signal is applied to the control logic 38. In this case, too, the storage position in the data buffer 28 is not clear, and therefore the flip-flop 22 is reset via signal line 45 by the control logic 38. Subsequent operations are quite the same as that in the case in which the value of data count 33 is reduced to zero before the advanced processing of a new CCW is completed as mentioned above.

In the above-mentioned case where the data address 34 is identical to the CCW address 56, the content of CCW to be read next is stored in the data buffer 28, and therefore a CCW is obtainable without access to MS. Therefore, as an alternative operation, the applicable data is stored in the control logic 38 through the data register 29 and the data bus 46, and quite the same operation is performed when the value of data count 33 is reduced to zero as when the advanced processing of the new CCW is completed before the value of data count 33 is reduced to zero as mentioned above. By this control operation, even in the case where the next CCW is rewritten by the data read, the next CCW is obtained at high speed without access to MS, thus attaining substantially the same result as when the next CCW is processed in advance.

I claim:

1. A channel device for executing data transfer between I/O device and a main storage unit in accordance with a channel command word read out from said main storage unit, said main storage unit having an access width which is n times as large as a width of data transferred from said I/O device, comprising:

a first data buffer including a plurality of groups of n data storage positions each having a data width which is equal to the width of said data transferred from said I/O device;

a second data buffer including a plurality of data storage positions each having a data width which is equal to the width of said data transferred from said I/O device;

first data input means connected between said I/O device and said second data buffer for inputting a transferred data from said I/O device into a selected one of the data storage positions of said second data buffer;

data storage position designation means connected to said first data buffer for designating a selected one of the data storage positions of said first data buffer in accordance with a data address part of said channel command word;

second data input means connected between said first and second data buffer for reading out data from a selected one of the data storage positions of said second data buffer in which a data is stored by said first data input means and then inputting said data into the selected one of the data storage positions of said first data buffer, which are designated by said data storage position designated means; and means connected between said first data buffer and main storage unit for reading out a data from a selected one of the data storage position groups of said first data buffer in which a data is stored by said second data input means and then transferring said data to said main storage unit.

2. A channel device according to claim 1, further comprising means connected to said data storage position designation means for interrupting the input operation of said second data input means during a period of time when the function of said data storage position designation means is invalid.

3. A channel device according to claim 1, further comprising means connected to said main storage unit for generating a request for reading out the channel command word from said main storage unit.

4. A channel device according to claim 3, further comprising means connected to said main storage unit for validating the function of said data storage position designation means after completion of read-out of the channel command word in accordance with said read-out request generating means.

5. A channel device according to claim 3, further comprising means for indicating a remaining data count to be stored in said first data buffer, said means for generating a request for reading out the channel command word being actuated in response to said remaining data count being zero.

6. A channel device according to claim 3, further comprising means for indicating a remaining data count to be stored in said first data buffer, said means for generating a request for reading out the channel command word being actuated in response to a data length of said remaining data count being equal to that of said channel command word or below.

7. A channel device according to claim 1, further comprising means for indicating a remaining data count to be stored in said first data buffer, the operation of said data storage positions designation means being stopped in response to said remaining data count being zero.

* * * * *

UNITED STATES PATENT AND TRADEMARK OFFICE
CERTIFICATE OF CORRECTION

PATENT NO. : 4,272,809
DATED : June 9, 1981
INVENTOR(S) : Yoshihiko KADOWAKI

It is certified that error appears in the above-identified patent and that said Letters Patent are hereby corrected as shown below:

In claim 3, line 1, change "claim 1," to read --claim 2,--; and

In claim 7, line 1, change "claim 1," to read --claim 2,--.

Signed and Sealed this

First Day of November 1983

[SEAL]

Attest:

Attesting Officer

GERALD J. MOSSINGHOFF

Commissioner of Patents and Trademarks